US011635675B2

United States Patent
Hu et al.

(10) Patent No.: US 11,635,675 B2
(45) Date of Patent: Apr. 25, 2023

(54) LASER PROJECTOR WITH REDUCED OPTICAL ELEMENTS AND IMPROVED POWER EFFICIENCY

(71) Applicant: QISDA CORPORATION, Taoyuan (TW)

(72) Inventors: Chun-Hao Hu, Tainan (TW); Tsung-Hsun Wu, Taoyuan (TW); Ching-Tze Huang, Taoyuan (TW); Ping-Chung Chou, Taichung (TW)

(73) Assignee: Qisda Corporation, Taoyuan (TW)

( * ) Notice: Subject to any disclaimer, the term of this patent is extended or adjusted under 35 U.S.C. 154(b) by 77 days.

(21) Appl. No.: 17/191,647

(22) Filed: Mar. 3, 2021

(65) Prior Publication Data

US 2021/0373427 A1 Dec. 2, 2021

(30) Foreign Application Priority Data

May 29, 2020 (CN) .......................... 202010472250.0

(51) Int. Cl.
*G03B 21/20* (2006.01)
*G02B 27/14* (2006.01)
*G02B 27/28* (2006.01)

(52) U.S. Cl.
CPC ....... *G03B 21/2066* (2013.01); *G02B 27/141* (2013.01); *G02B 27/145* (2013.01); *G02B 27/283* (2013.01)

(58) Field of Classification Search
CPC ............ G03B 21/2066; G03B 21/2073; G03B 21/2033; G03B 21/204; G03B 33/12; G02B 27/141; G02B 27/145; G02B 27/149; G02B 27/283
See application file for complete search history.

(56) References Cited

U.S. PATENT DOCUMENTS

| | | | | | |
|---|---|---|---|---|---|
| 5,909,259 | A | * | 6/1999 | Ishino ................. | G02B 27/149 359/489.09 |
| 6,176,586 | B1 | * | 1/2001 | Hirose ................. | H04N 9/3167 353/31 |
| 6,379,010 | B1 | * | 4/2002 | Suzuki ............... | G03B 21/2073 353/31 |
| 6,628,346 | B1 | * | 9/2003 | Ebiko .................. | G02B 27/283 353/34 |
| 6,789,902 | B2 | * | 9/2004 | Hayashi ............. | G02B 27/1026 353/34 |

(Continued)

FOREIGN PATENT DOCUMENTS

| | | | |
|---|---|---|---|
| CN | 109298586 A | 2/2019 | |
| JP | 2004286947 A | * 10/2004 | ............. G03B 21/00 |

*Primary Examiner* — Magda Cruz

(57) ABSTRACT

A laser projector includes a laser light source, a first dichroic mirror, a second dichroic mirror, three light valves and a beam combining module. The laser light source is used to generate a composite polarized beam. The first dichroic mirror is used to receive the composite polarized beam, and separate the composite polarized beam into a first color beam and a relay beam. The second dichroic mirror is used to receive the relay beam, and separate the relay beam into a second color beam and a third color beam. The three light valves are used to modulate the three color beams into three light beams. The beam combining module is used to combine the three light beams to form a multi-color image.

4 Claims, 2 Drawing Sheets

(56) References Cited

U.S. PATENT DOCUMENTS

| | | | |
|---|---|---|---|
| 6,995,917 B1* | 2/2006 | Sampsell | G02B 27/145 353/34 |
| 10,571,788 B2 | 2/2020 | Akiyama | |
| 2004/0218281 A1* | 11/2004 | Hirata | H04N 9/315 359/634 |
| 2006/0055888 A1* | 3/2006 | Inoko | G03B 21/006 348/E9.027 |
| 2008/0100804 A1* | 5/2008 | Kanayama | H04N 9/3167 362/19 |
| 2009/0027568 A1* | 1/2009 | Nishimura | H04N 9/3105 348/744 |
| 2017/0168379 A1* | 6/2017 | Hashizume | G02B 5/3083 |
| 2018/0059518 A1* | 3/2018 | Aizaki | G03B 33/12 |

\* cited by examiner

LASER PROJECTOR WITH REDUCED OPTICAL ELEMENTS AND IMPROVED POWER EFFICIENCY

CROSS REFERENCE TO RELATED APPLICATION

This application claims priority to China Patent Application No. 202010472250.0, filed May 29, 2020, and incorporated herein by reference in its entirety.

BACKGROUND OF THE INVENTION

1. Field of the Invention

The present invention relates to a laser projector, in particular to a laser projector that can reduce optical elements and improve power efficiency.

2. Description of the Prior Art

The advantages of using laser light source technology in projectors are that laser light has higher light efficiency and has no need to focus, making it convenient to use. The laser light source also has a very compact design. In an optical machine, the laser beam can be modulated to generate the required light color, effectively replacing the optical lens system required for a light emitting diode light source, which can greatly reduce the amount of optical materials and production, reduce space, and consequently implement the design of a miniaturized projector. The laser light source has a rapid response time. When the projection is dormant, the projection can automatically reduce the brightness, thereby saving power, and can automatically adjust the brightness according to the ambient environment.

However, laser projectors generally use blue laser sources to provide illuminating beams. The illuminating beam needs to be converted into an excited beam of other colors by a wavelength conversion device (such as a color wheel partially coated with phosphor or quantum dots), and then combined with the illuminating beam. The prior art beam combining module utilizes a light splitter to reflect the illuminating beam and project it to the color wheel. The color wheel has wavelength conversion material for generating an excited beam, and the excited beam can directly penetrate the light splitter. In addition, part of the illuminating beam will pass through the portion of the color wheel without wavelength conversion material, return to the light splitter through multiple reflectors, and be reflected by the light splitter to combine with the excited beam. Therefore, the prior art beam combining module needs to be equipped with a variety of optical components, which not only greatly increases the amount of hardware, but also increases the weight and volume of the beam combining module.

SUMMARY OF THE INVENTION

In an embodiment, a laser projector comprises a laser light source, a first dichroic mirror, a second dichroic mirror, three light valves and a beam combining module. The laser light source is configured to generate a composite polarized beam. The first dichroic mirror is configured to receive the composite polarized beam, and separate the composite polarized beam into a first color beam and a relay beam. The second dichroic mirror is configured to receive the relay beam, and separate the relay beam into a second color beam and a third color beam. The three light valves are configured to receive the first, second and third color beams and modulate the first color beam into a first light beam, the second color beam into a second light beam, and the third color beam into a third light beam. The beam combining module is configured to combine the first light beam, the second light beam and the third light beam to form a multi-color image.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
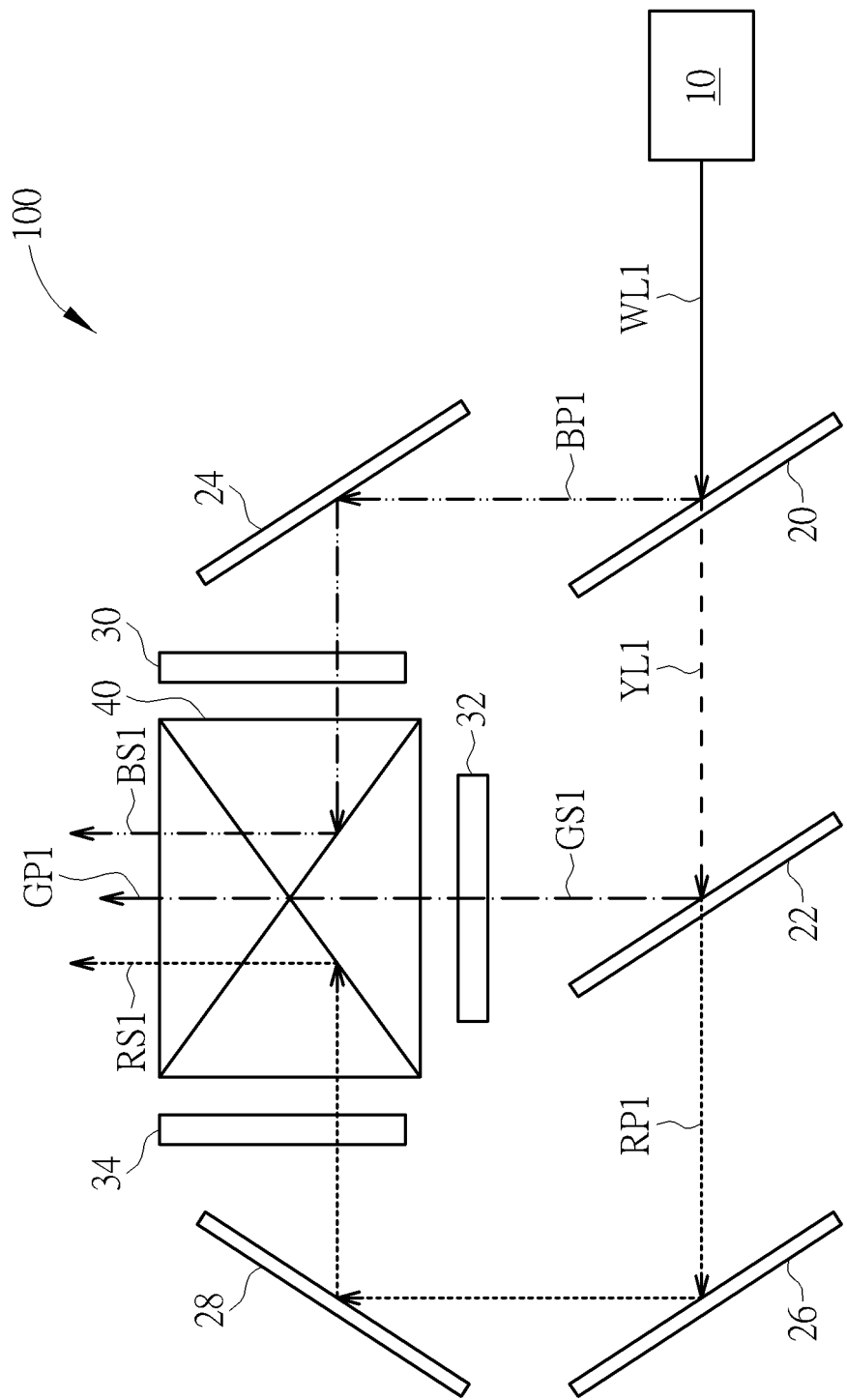
FIG. 1 is a schematic diagram of a laser projector according to an embodiment of the present invention.

FIG. 1 is a schematic diagram of a laser projector 100 according to an embodiment of the present invention. The laser projector 100 comprises a laser light source 10, a first dichroic mirror 20, a second dichroic mirror 22, a first mirror 24, a second mirror 26, a third mirror 28, a first light valve 30, a second light valve 32, a third light valve 34 and a beam combining module 40. The laser light source 10 is used to generate a composite polarized beam WL1. The composite polarized beam WL1 may comprise a first color beam BP1, a second color beam GS1 and a third color beam RP1. The first color beam BP1 can be a blue beam with P polarization, the second color beam GS1 can be a green beam with S polarization, and the third color beam RP1 can be a red beam with P polarization.

The first dichroic mirror 20 receives the composite polarized beam WL1, and separates the composite polarized beam WL1 into a first color beam (P-polarized blue light beam) BP1 and a relay beam YL1. The second dichroic mirror 22 receives the relay beam YL1, and separates the relay beam YL1 into a second color beam (S-polarized green beam) GS1 and a third color beam (P-polarized red beam) RP1. The first reflecting mirror 24 is disposed on the light path of the first color beam BP1 to reflect the first color beam BP1 received from the first dichroic mirror 20 to the first light valve 30. The second reflecting mirror 26 and the third reflecting mirror 28 are disposed on the light path of the third color beam RP1 to sequentially reflect third color beam RP1 received from the second dichroic mirror 22 to the third light valve 34. The second dichroic mirror 22 transmits the second color beam GS1 to the second light valve 32. The first light valve 30, the second light valve 32, and the third light valve 34 may be made of liquid crystal materials for receiving and modulating the first color beam BP1, the second color beam GS1 and the third color beam RP1, respectively.

After the first color beam BP1 is modulated by the first light valve 30, the polarization state is changed to become an S-polarized blue light beam BS1. After the second color beam GS1 is modulated by the second light valve 32, the polarization state is changed to become a P-polarized green light beam GP1. After the third color beam RP1 is modulated by the third light valve 34, the polarization state is changed to become an S-polarized red light beam RS1. Finally, the beam combining module 40 combines the S-polarized blue light beam BS1, the P-polarized green light beam GP1 and the S-polarized red light beam RS1 to form a multi-color image.

Figure 2:
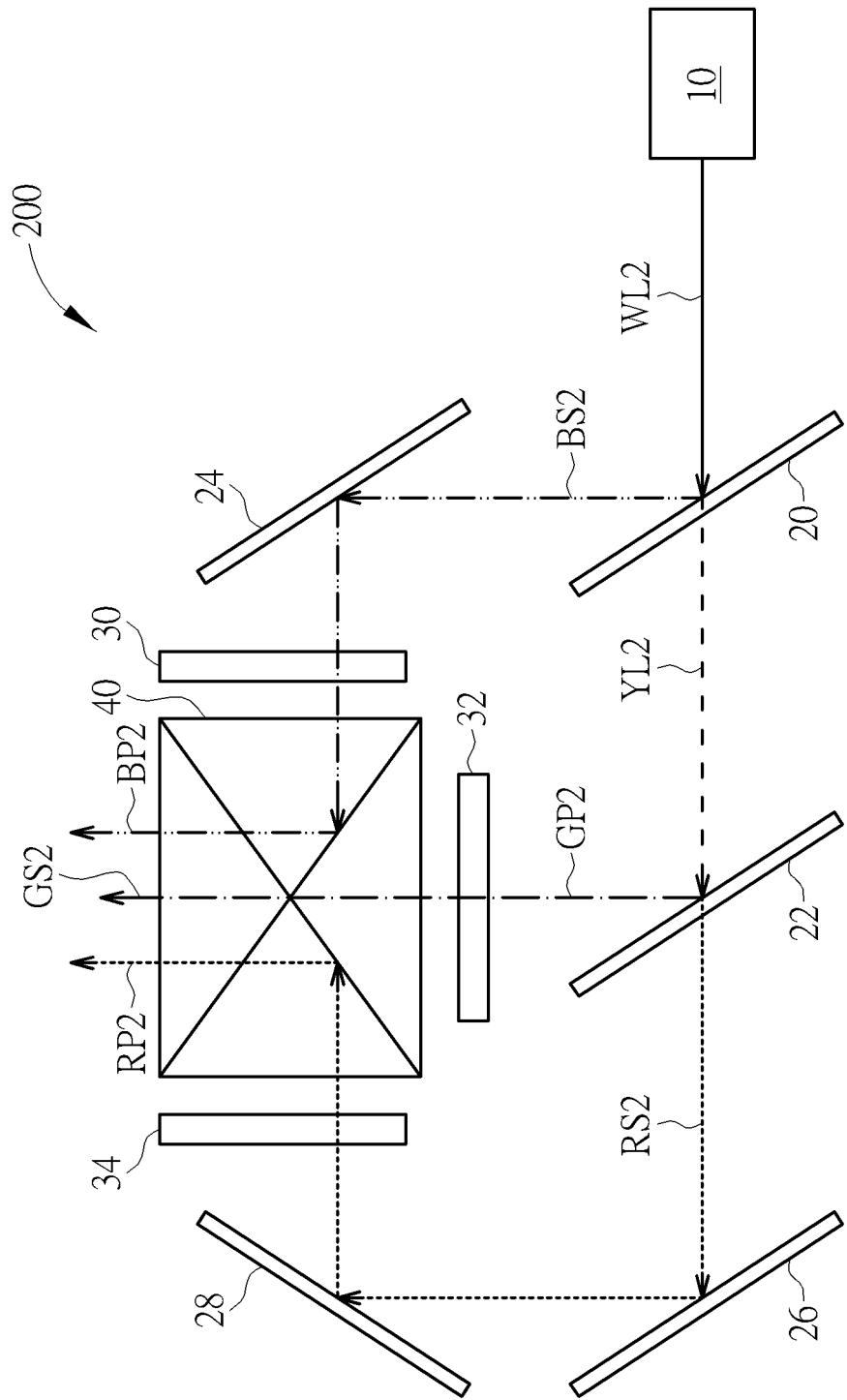
FIG. 2 is a schematic diagram of a laser projector according to another embodiment of the present invention.

FIG. 2 is a schematic diagram of a laser projector 200 according to another embodiment of the present invention. In this embodiment, the composite polarized beam WL2 may comprise a first color beam BS2, a second color beam GP2, and a third color beam RS2. The first color beam BS2 may be a blue light beam with S polarization. The second color beam GP2 may be a green light beam with P polarization. The third color beam RS2 may be a red light beam with S polarization. The first dichroic mirror 20 receives the composite polarized beam WL2, and separates the composite polarized beam WL2 into the first color beam (S-polarized blue light beam) BS2 and a relay beam YL2. The second dichroic mirror 22 receives the relay beam YL2, and separates the relay beam YL2 into the second color beam (P-polarized green beam) GP2 and the third color beam (S-polarized red beam) RS2. The other settings are the same as the laser projector 100 in FIG. 1.

After passing through the aforementioned optical paths, the first color beam BS2 is modulated by the first light valve 30, and then changes its polarization state to become a P-polarized blue light beam BP2. The second color beam GP2 is modulated by the second light valve 32, and then changes its polarization state to become an S-polarized green light beam GS2. The third color beam RS2 is modulated by the third light valve 34, and then changes its polarization state to become a P-polarized red light beam RP2. Finally, the beam combining module 40 combines the P-polarized blue light beam BP2, the S-polarized green light beam GS2 and the P-polarized red light beam RP2 to form a multi-color image.

In other embodiments, the optical paths of the P-polarized blue light beam BP2 and the S-polarized green light beam GS2 can be reversed. In other words, the P-polarized blue light beam BP2 can be modulated by the second light valve 32 and then enter the beam combining module 40. The S-polarized green light beam GS2 can be modulated by the first light valve 30 and then enter the beam combining module 40. The dichroic mirrors 20, 22, the reflecting mirror 24, the light valves 30, 32 and the beam combining module 40 can be adjusted according to the changes of the optical paths.

In the embodiment, the wavelength range of the S-polarized green light beam that can be received and projected by the beam combining module 40 is approximately between 470 nm and 600 nm. The wavelength range of the P-polarized green light beam that can be received and projected by the beam combining module 40 is approximately between 490 nm and 580 nm, which is narrower than the wavelength range of the S-polarized green light beam, so the illumination energy is more concentrated. Compared with the S-polarized green light beam, the beam combining module 40 can project the P-polarized green light beam to provide a higher illumination power, brighter image and more saturated color.

In summary, the laser projectors of the embodiments each may comprise a laser light source, a plurality of dichroic mirrors, a plurality of reflecting mirrors, a plurality of light valves, and a beam combining module. The laser light source is used to provide a composite polarized beam, which comprises a red beam with P polarization state, a green beam with S polarization state, and a blue beam with P polarization state, or a red beam with S polarization state, a green beam with P polarization state, and a blue beam with S polarization state. In this way, the laser projectors can omit other components for polarization conversion, and avoid unnecessary power loss, so as to produce more saturated images.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A laser projector comprising:
    a laser light source configured to generate a composite polarized beam;
    a first dichroic mirror configured to receive the composite polarized beam, and separate the composite polarized beam into a blue light beam with S polarization and a yellow light beam;
    a second dichroic mirror configured to receive the yellow light beam, and separate the yellow light beam into a green light beam with P polarization and a red light beam with S polarization;
    a first light valve configured to receive the blue light beam with S polarization and modulate the blue light beam with S polarization into a blue light beam with P polarization;
    a second light valve configured to receive the green light beam with P polarization and modulate the green light beam with P polarization into a green light beam with S polarization;
    a third light valve configured to receive the red light beam with S polarization and modulate the red light beam with S polarization into a red light beam with P polarization; and
    a beam combining module configured to combine the blue light beam with P polarization, the green light beam with S polarization and the red light beam with P polarization to form a multi-color image.

2. The laser projector of claim 1 wherein the first light valve, the second light valve and the third light valve are composed of liquid crystal materials.

3. The laser projector of claim 1 wherein the second dichroic mirror reflects the green light beam with P polarization to the second light valve.

4. The laser projector of claim 1 further comprising:
    a first reflecting mirror disposed for reflecting the blue light beam with S polarization to the first light valve; and
    a second reflecting mirror and a third reflecting mirror disposed for sequentially reflecting the red light beam with S polarization to the third light valve.

\* \* \* \* \*